C. L. DUNHAM.
NUT LOCK.
APPLICATION FILED MAR. 22, 1920.

1,409,934.

Patented Mar. 21, 1922.

Inventor:
Charles L. Dunham.
By James N. Ramsey
Attorney.

UNITED STATES PATENT OFFICE.

CHARLES L. DUNHAM, OF PENNSBORO, WEST VIRGINIA.

NUT LOCK.

1,409,934.  Specification of Letters Patent.  Patented Mar. 21, 1922.

Application filed March 22, 1920. Serial No. 367,853.

*To all whom it may concern:*

Be it known that I, CHARLES L. DUNHAM, a citizen of the United States, residing at Pennsboro, in the county of Ritchie and State of West Virginia, have invented certain new and useful Improvements in Nut Locks, of which the following is a specification.

My invention relates to new and useful means for locking male and female threaded elements together upon an object.

The objects of my invention are to provide an efficient locking means for securing an ordinary nut in fixed position upon a bolt; to provide a nut lock which may be used in locked position upon a bolt either alone, or in combination with an ordinary nut; to provide a locking element of simple and economical construction adapted to securely hold and lock an object between said locking element and the head of a bolt; and to provide a locking element so constructed as to compensate for the contraction and expansion of the members which it locks.

My invention consists in a resilient nut having a recessed or arched face adapted to engage the convex face of a common or ordinary nut, or the face of the object against which it is screwed.

My invention also consists in the details of construction and in the combination and arrangement of parts as herein set forth and claimed.

Figure 1:
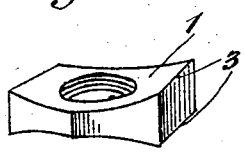
Fig. 1 is a perspective view of a hexagon nut lock.
Figure 3:
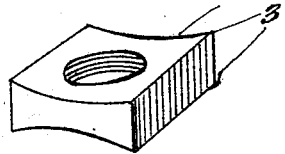
Fig. 3 is a perspective view of a modified form of my nut lock.

In the embodiment of my invention as illustrated, and which shows preferred constructions, the nut lock 1 is formed of comparatively thin resilient material having its engaging faces 2 recessed or arched to provide projecting engaging edges 3. When it is desired to lock the common or ordinary nut 4 upon bolt 5, simply screw the nut thereon in the ordinary way until it engages, with light pressure, the object which it is to hold, then screw the nut lock 1 thereon until the engaging edges 3 are forced into gripping engagement with the convex face of nut 4 and until the central portion of said nut lock is drawn into close proximity to nut 4 due to its resiliency. This will cause the threads of the bolt and nut lock to engage each other at angles to each other thereby producing a binding and locking effect between the nut lock and bolt so that the nut 4, if there is space between it and the object on which the bolt is mounted, may be moved away from said nut lock as shown in Fig. 1, without disturbing the locking relation of the nut lock upon the bolt.

The particular shape of the common or ordinary nut 4 is immaterial as it may be square, hexagon or any other desired shape and the form of the nut lock is also immaterial as it may also be square, hexagon or any other shape so long as it has at least one arched or recessed surface forming gripping edges to engage the nut or other object against which it is screwed to force the gripping edges into holding engagement with the object or the nut, while the central portion of the nut lock is forced downwardly to form a binding locking engagement between the nut lock and bolt. In screwing the nut lock into such position the lower arch or concavity of the nut lock will be partially or nearly flattened out, depending upon the degree of tightness that the gripping edges are screwed upon the nut. At the same time the depth of the upper concave surface will be correspondingly increased and the tighter the nut lock is turned, the more secure will be the locking engagement.

An important advantage of my improved nut lock, consists in providing for contraction and expansion of the bolt and nut and object on which they are secured, since the resiliency of the locking member will compensate therefor.

Figure 2:
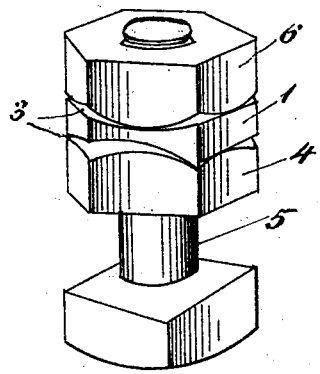
Fig. 2 is a perspective view of a bolt with two ordinary hexagon nuts with the nut lock interposed between the nuts in locking position.
Figure 4:
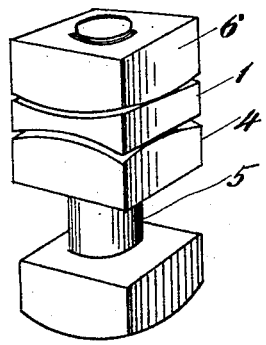
Fig. 4 is a perspective view of a bolt showing two square ordinary nuts with the resilient nut lock interposed therebetween and engaging the convex surfaces of the nuts in locking position.

In cases where there is unusual vibration of parts and greater holding strength is desired, an additional ordinary nut 7 may be screwed onto the bolt in engagement with the upper side of the nut lock until the gripping edges are in locking engagement with said nut as shown in Figs. 2 and 4.

What I claim as new and desire to secure by Letters Patent is:

A bolt, two ordinary nuts having their convex surfaces disposed towards each other and an interposed resilient locking element having a threaded opening therethrough and having arched surfaces engaging said convex surfaces respectively, substantially as set forth and for the purposes specified.

CHARLES L. DUNHAM.